United States Patent
Arnoth et al.

(10) Patent No.: US 11,140,129 B2
(45) Date of Patent: Oct. 5, 2021

(54) DISTRIBUTED FIREWALL SYSTEM

(71) Applicant: CYAN SECURITY GROUP GMBH, Vienna (AT)

(72) Inventors: Peter Arnoth, Vienna (AT); Markus Cserna, Hagenbrunn (AT)

(73) Assignee: CYAN SECURITY GROUP GMBH, Vienna (AT)

( * ) Notice: Subject to any disclaimer, the term of this patent is extended or adjusted under 35 U.S.C. 154(b) by 11 days.

(21) Appl. No.: 16/347,187

(22) PCT Filed: Nov. 3, 2017

(86) PCT No.: PCT/EP2017/078147
§ 371 (c)(1),
(2) Date: May 2, 2019

(87) PCT Pub. No.: WO2018/083219
PCT Pub. Date: May 11, 2018

(65) Prior Publication Data
US 2020/0267120 A1    Aug. 20, 2020

(30) Foreign Application Priority Data
Nov. 3, 2016 (EP) .................................... 16197107

(51) Int. Cl.
*H04L 29/06*    (2006.01)
*H04W 12/121*    (2021.01)
(Continued)

(52) U.S. Cl.
CPC .......... *H04L 63/02* (2013.01); *H04L 63/0218* (2013.01); *H04L 63/0281* (2013.01);
(Continued)

(58) Field of Classification Search
CPC ..... H04L 12/66; H04L 63/02; H04L 63/0218; H04L 63/0281; H04L 63/1408;
(Continued)

(56) References Cited

U.S. PATENT DOCUMENTS 8,286,243 B2 * 10/2012 Clark .................. H04L 63/0428
726/23
9,798,883 B1 * 10/2017 Gil ......................... G06F 21/577
(Continued)

FOREIGN PATENT DOCUMENTS

EP         2388727 A1    11/2011

OTHER PUBLICATIONS

European Patent Office, Extended European Search Report Issued in Application No. 16197107.2, dated Apr. 18, 2017, 10 pages.
(Continued)

*Primary Examiner* — Joseph P Hirl
*Assistant Examiner* — Ka Shan Choy
(74) *Attorney, Agent, or Firm* — McCoy Russell LLP

(57) ABSTRACT

A method and system comprising a network gateway for monitoring a network traffic between a network client and the network gateway, and at least one network client connected to said network gateway and comprising means for applying host-based protection measures are provided, wherein the network gateway evaluates the monitored traffic for indications of undesired behaviour and has control of the means for applying host-based protection measures of the at least one network client. Optionally network-based protection measures activated at the network gateway may be combined with the host-based protection measures and/or suspicious device events observed at the network client may be accounted for when assessing suitable protection measures in addition to the traffic monitored at the network gateway.

10 Claims, 4 Drawing Sheets

(51) Int. Cl.
*H04W 12/122* (2021.01)
*H04W 12/128* (2021.01)

(52) U.S. Cl.
CPC ....... *H04L 63/1425* (2013.01); *H04W 12/121* (2021.01); *H04W 12/122* (2021.01); *H04W 12/128* (2021.01)

(58) Field of Classification Search
CPC .......... H04L 63/1425; H04W 12/1201; H04W 12/1202; H04W 12/1204; H04W 12/1208
See application file for complete search history.

(56) References Cited

U.S. PATENT DOCUMENTS

| | | | |
|---|---|---|---|
| 2004/0044912 | A1 | 3/2004 | Connary et al. |
| 2008/0059474 | A1* | 3/2008 | Lim ...................... G06F 21/316 |
| 2013/0097701 | A1* | 4/2013 | Moyle .................... H04L 63/20 726/22 |
| 2016/0198341 | A1* | 7/2016 | Fransen ................ H04W 12/12 455/410 |
| 2017/0289178 | A1* | 10/2017 | Roundy ................ G06F 21/554 |

OTHER PUBLICATIONS

ISA European Patent Office, International Search Report Issued in Application No. PCT/EP2017/078147, dated Feb. 13, 2018, WIPO, 2 pages.

* cited by examiner

DISTRIBUTED FIREWALL SYSTEM

CROSS-REFERENCE TO RELATED APPLICATIONS

The present application is a U.S. National Phase of International Patent Application Serial No. PCT/EP2017/078147 entitled "DISTRIBUTED FIREWALL SYSTEM," filed on Nov. 3, 2017. International Patent Application Serial No. PCT/EP2017/078147 claims priority to European Patent Application No 16197107.2, filed on Nov. 3, 2016. The entire contents of each of the above-cited applications are hereby incorporated by reference for all purposes.

TECHNICAL FIELD

The present invention relates to IT (information technology) security, a computer-implemented method and a distributed system for providing effective protection of mobile devices connected to a security provider from predetermined types of malicious behaviour of computer programs running on the mobile device. Specific embodiments include systems and methods to combine a network gateway security system with security modules on a network client.

BACKGROUND AND SUMMARY

Mobile devices are for example smartphones, tablets or other portable devices that rely on battery power for operation and are operated with focus on non-stationary use. Characteristics of modern mobile devices are a graphics display, some kind of customer input devices like touch display, keyboard or voice control, Internet connectivity (through mobile data, WiFi or other communication links) and support of installation of software packages like apps. Computing power on such mobile devices highly depends on electric energy available, which is typically provided by batteries. The more computing power is needed, the more battery is used in an amount of time. Battery power is limited though and high usage of battery on mobile devices results in short battery life and bad customer experience.

At present, network gateway security systems act purely remotely, i.e. by remotely monitoring and controlling incoming and outgoing traffic. Such systems are commonly known as network firewalls. Other examples are intrusion detection/prevention systems (OSI layer 3, 4) or web proxy software (OSI layer 7). Those systems are limited to network-based protection measures, such as blocking certain types of traffic through the gateway, when an undesired behaviour is detected based on the monitored traffic originating from or directed at the network client. This type of security system is also referred to as "on-net" security system. Those systems have no control of the activities on the network client itself, despite the fact that such activities may cause harm to data stored on the network client and also establish alternative paths for network access, thereby sidestepping the network gateway and its network-based protection measures.

On the other hand, host-based security systems, which are presently known, are configured to perform security checks directly on a network connected device (a network client). Such systems (also referred to an "off-net security" systems) are usually implemented as software, which is installed on the network client and run directly on the network client, like anti-virus modules or local software firewall systems. This type of systems requires significant resources of the device itself (the network client), in particular regarding memory requirements, computing time and power consumption. Moreover, such host-based systems must be updated frequently in order to react to newly-discovered security threats, which typically causes frequent network accessed and thereby further increases the resource requirements independent of actual device usage. In particular, any data transfer on mobile devices is both a battery demanding process and a cost factor for the user. Mobile carriers may charge for every Megabyte of data transferred between the mobile device and the Internet. Thus, frequent updates may degrade user experience and incur costs for the user. Finally host-based systems are naturally confined in their monitoring to activities of a single network client. They cannot detect undesired behaviour involving multiple clients, which may only be detectable by patterns matching certain actions concerted or shared among multiple clients (correlations).

An object of the present invention is to provide a method, a security system and components thereof, which provide the effectiveness of host-based systems in combination with the power and unobtrusiveness of network-based systems.

In order to achieve the objective mentioned above, the present invention provides a computer-implemented method comprising: monitoring, at a network gateway, a network traffic between a network client and the network gateway, testing, at the network gateway, the monitored traffic for one or more network traffic patterns indicating undesired behaviour of the network client, if it results from the testing that one or more network traffic patterns are matched, increasing, at the network gateway, a client threat-level associated with the network client based on the matched one or more network traffic patterns, transmitting, as soon as a client threat-level exceeds a predetermined acceptable range, an action command from the network gateway to a network client associated with said client threat-level, instructing the network client to activate a host-based protection measure, after receiving the action command, activating, at the network client, the host-based protection measure instructed by the network gateway, wherein the host-based protection measure is adapted to obstruct further undesired behaviour or to obtain additional information concerning the undesired behaviour indicated by the matched network traffic patterns.

Accordingly, the objective mentioned above can be achieved according to the present invention with a network gateway comprising means for carrying out the steps of monitoring a network traffic between a network client and the network gateway, testing the monitored traffic for one or more network traffic patterns indicating undesired behaviour of the network client, increasing a client threat-level associated with the network client based on the matched one or more network traffic patterns, if it results from the testing that one or more network traffic patterns are matched, and sending an action command to a network client associated with said client threat-level, as soon as the client threat-level exceeds a predetermined acceptable range, the action command instructing the network client to activate a host-based protection measure.

Correspondingly, the objective mentioned above can be achieved according to the present invention with a network client comprising means for carrying out the steps of receiving an action command from a network gateway, instructing the network client to activate a host-based protection measure, and activating the host-based protection measure instructed by the network gateway after receiving the action command.

One or more network clients can be connected to a single network gateway and the client threat-levels associated with said network clients may be stored in a database table accessible by the network gateway, in particular by the means for increasing the client threat-level. The client threat-level can be represented by a number, e.g. a floating-point number.

The monitoring at a network gateway generally concerns the network traffic between one or more network clients and the network gateway. It may be limited to monitoring meta-data of said traffic. Alternatively or additionally, the full content (payload) of the traffic may be monitored, e.g. by applying deep-packet inspection.

The term "undesired behaviour" generally refers to undesired network traffic to and from a mobile device and undesired background activities on the mobile device. What is undesired is a matter of configuration and optionally user preferences. Typically, this may include any network traffic and activity that is not necessary to provide the service desired by the user. For example, background processing and network access on the network client that is unrelated to the required operation of the device (the network client) and also unrelated to user interaction with the device may qualify as undesired.

The network traffic patterns indicating undesired behaviour may include for example a network traffic pattern matching any access to a suspicious network target based on URL categorization (i.e. on a blacklist listing all suspicious targets and/or on a whitelist listing all trusted target) and/or a network traffic pattern matching a signature of a network communication with a set of predetermined signature patterns of malicious network communication (e.g. transmitting a program or script known to be malicious, such as a known computer virus or the like).

For increasing the client threat-level associated with the network client based on the matched one or more network traffic patterns, the network gateway accesses a previous client threat-level associated with the specific client in whose traffic the match with one or more of the network traffic patterns has been determined. For this purpose, the network gateway may store a table with a record for each connected network client, wherein each record comprises a client threat-level associated with the respective network client. The predetermined acceptable range may be defined by a high watermark. More than one acceptable range may be defined, associated with different protection measures that may be triggered once the respective range is exceeded.

Transmitting an action command from the network gateway to a network client associated with said client threat-level comprises sending the action command from the network gateway to the network client and receiving the action command from the network gateway at the network client. The action command can be a message, which is interpreted at the network client. Depending on the message content, the network client activates one or more host-based protection measures. There may be different action commands triggering different host-based protection measures at the network client, e.g. depending on the current client threat-level.

Generally, the host-based protection measure on the network client triggered by the reception of the action command is adapted to obstruct further undesired behaviour and/or to obtain additional information concerning the undesired behaviour indicated by the matched network traffic patterns. Such host-based protection measures are generally more effective and/or informative than network-based protection measures, which can be applied purely on the network gateway. For instance, malicious programs may avoid or sidestep protection measures enabled at the network gateway but cannot avoid or sidestep protection measures enabled locally on the device acting as the network client. For example, host-based protection measures can apply to all communication interfaces, including those not connected to the network gateway and are thus more effective in controlling the network traffic of the network client as a whole. Examples for host-based protection measures are: displaying a message at the network client (e.g. the customer device) to raise awareness of possible security threats (wherein the message preferably is a system message not interruptible by other programs running on the network client), initiating the execution of fast/shallow or slow/in-depth anti-virus scans on the network client, stopping as a precautionary action the execution of unknown programs, scripts or applications running on the network client, and/or prohibiting the network client from activating alternative network access paths (e.g. joining public WiFi networks or Bluetooth connections). Protection measures adapted to obtain additional information concerning the undesired behaviour indicated by the matched network traffic patterns can improve security by enabling a more accurate security assessment, possibly further increasing the client threat-level if the additional information confirms the presence of undesired behaviour on the network client. Consequently, the network gateway may trigger more severe protection measures adapted to obstruct this confirmed behaviour.

The actual action command transmitted and consequently the host-based protection measure activated by the network client may depend on the severity of the client threat-level actually observed, e.g. how far the client threat-level is away from the acceptable range. Since every protection measure restricts or at least potentially disturbs the user of the network client, depending on the client threat-level a reasonable protection measure is selected and triggered. The reasonable protection measure is essentially the least intrusive protection measure necessary to ensure the overall security status of a customer device (which is a typical network client) and avoid as far as possible negative side effects that would be noticeable if all actions are applied all the time (e.g. battery drain due to constant anti-virus scans, prohibition to start unknown applications, prohibition to join public WiFi networks). Consequently, it will be considered unreasonable when a relatively low client threat-level only slightly above the acceptable range (e.g. above a first high watermark) leads to a complete disconnection of all network interfaces and to an immediate shut-down of the device at the network client.

Instead it will be considered reasonable if such a low threat-level, which may be caused by accidentally accessing a suspicious website, triggers a notification of the user of the network client in order to raise awareness of the increased danger such that the user is alerted to possible risks and may choose to interrupt the present activity. When reaching a medium client threat-level (e.g. above a second high watermark) it may be reasonable to trigger additional monitoring measures or inspections on the network client, e.g. a virus scan of the network client at a file system level. An even higher client threat-level (e.g. above a third watermark) may cause increasingly radical protection measures, such a partial (i.e. to certain destinations) or complete blocking of network access, termination of some or all applications not specifically trusted, or even a complete rescue shut-down to avoid any damage to data stored on the network client.

The actual action command transmitted and consequently the host-based protection measure activated by the network client may also depend on the power consumption and required data transfer of the respective protection measure, in particular if the network client is a mobile device. The network gateway may account for such factors and enable or disable certain host-based protection measures in order to allow for optimal battery and mobile data use on the mobile device.

Advantageously the method according to the present invention may further comprise: activating, as soon as a client threat-level exceeds a predetermined acceptable range, at the network gateway, a network-based protection measure, wherein the network-based protection measure is adapted to protect the network client from potentially malicious network traffic or to notify a user of the network client of malicious network traffic, wherein malicious network traffic is network traffic related with the undesired behaviour indicated by the matched network traffic patterns.

Accordingly, a network gateway according to the invention may comprise means to perform the step of activating (at said network gateway) a network-based protection measure as soon as a client threat-level exceeds a predetermined acceptable range, wherein the network-based protection measure is adapted to protect the network client from malicious network traffic or to notify a user of the network client of malicious network traffic.

In those instances, additional security can be achieved by combining host-based and network-based protection measures. Network-based protection measures may be all types of measures that can also be applied by purely network-based security systems. Examples for network-based protection measures are: filtering or blocking predetermined types of traffic based on traffic meta-data such as source, destination, protocol, volume, time, frequency or any combination thereof, filtering or blocking based on traffic content (also called "payload"), manipulation of traffic to remove or mitigate malicious components, manipulation of traffic to inject components which change the processing by the network client, such as injecting a notification in a transmitted document to notify a user of the network client of the undesired behaviour and potentially malicious network traffic. The network-based protection measure may be specific to the network client, to which also the action command is transmitted, or is may apply to several or all network clients connected to the network gateway. In any case the possibility of choosing or combining host-based and/or network-based protection measures allows for a more fine-grained configuration and control of the most appropriate protection measure (i.e. which provides an optimal balance of effectiveness and invasiveness) applied by the security system for any given security threat.

Preferably the method according to the present invention may further comprise: concurrently with the monitoring of the network traffic between the network client and the network gateway at the network gateway, monitoring, at the network client, device events occurring on the network client, testing, at the network client, the monitored device events for one or more device event patterns indicating undesired behaviour, if it results from the testing that one or more device event patterns are matched, transmitting a device event report from the network client to the network gateway, reporting the matched device event patterns, after receiving the device event report, increasing, at the network gateway, the client threat-level associated with the network client from which the device event report has been received based on the reported device event patterns.

Accordingly, a network client according to the invention may comprise means to perform the steps of monitoring device events occurring on the network client, testing the monitored device events for one or more device event patterns indicating undesired behaviour, and sending a device event report from the network client to the network gateway, reporting the matched device event patterns, if it results from the testing that one or more device event patterns are matched.

Correspondingly, a network gateway according to the invention may comprise means to perform the steps of receiving a device event report from a network client, the device event report reporting one or more matched device event patterns, and increasing a client threat-level associated with the network client based on the reported device event patterns after receiving the device event report.

Device events generally refer to events characteristic of the operation of the device which is the network client. In particular this includes operating system events, which typically indicate state changes in relation to the device hardware or to the general device operation, and events triggered by local security monitoring means operated on the device, such as an anti-virus scanners or programs detecting potentially illegitimate access to sensitive data. A device event pattern indicating undesired behaviour may comprise one or more criteria which are applicable to certain device event properties. This includes the origin, time and frequency of the event as well as correlations between multiple events. Examples for device event patterns are: entering an unsafe public WiFi, engaging a file transfer via Bluetooth connection with a $3^{rd}$ party, tampering of device security systems (e.g. disabling an on-device firewall/security module).

The testing of the observed device events performed locally on the network client may be only a first step. Specifically, further tests may be applied at the network gateway based on the device event report sent from the network client to the network gateway. The device event report comprises a list of the device events observed on the network client. In this case the local tests performed on the network client are a first level of a multi-level trigger system for detecting undesired behaviour. Optional additional testing performed on the network gateway may take correlations between events from multiple different devices into account. Therefore, in general a match of a device event pattern may be only one of several criteria to cause an increase of a client threat-level associated with the network client from which the device event report has been received. Whether or not such an increase is performed and the amount of the increase are determined based on the device event patterns reported by the present network client and generally other network clients as well. For example, certain device event patterns (such as joining a public WiFi) may justify an increase by themselves, in which case the device event pattern may be associated with an increment which can be a constant increment or a function of event parameters of the device event. Other device events patterns (such as encrypting local data), when observed alone will not cause an increment of any client threat-level, but when observed at multiple network clients within a short duration will cause an increment of the client threat-levels of all clients involved. In any case, once any particular client threat-level exceeds the predetermined acceptable range, appropriate protection measures (host-based and/or network-based) will be applied as has been explained in more detail above.

The selection of host-based and/or network-based protection measures may also take power/battery consumption of each protection measure into account in order to avoid unnecessarily degrading the battery lifetime of a mobile network client (the network client being a mobile device). Optimal battery use may be achieved by carefully controlling what protection measures are necessary and helpful on a mobile device based on the client threat-level. Based on the client threat-level, and thus the likeliness to be exposed to a security threat, high battery demanding measures like Anti-Virus scans can be either fully disabled (low threat level), set to an on-demand scanning of downloaded files or apps (medium threat level) or full-scans triggered on the mobile device at certain intervals (high threat level). This maintains optimal battery usage in the absence of security threats and reduces bad customer experience in case of security modules unnecessarily performing operations with high computing power demands and thus high battery usage.

In order to achieve the advantages described above, the computer-implemented method according to the present invention may further comprise: reporting a battery consumption associated with a host-based protection measure from the network client to the network gateway, modifying the selection and/or timing of the action command transmitted from the network gateway to a network client, instructing the network client to activate a host-based protection measure, to prefer network-based protection measures or host-based protection measures associated with a reported relatively low battery consumption and/or to postpone host-based protection measures associated with a reported relatively high battery consumption to a higher client threat-level. More specifically, a first host-based protection measure, that is associated with a first reported battery consumption, may be selected (and activated) only after a second host-based protection measure, that is associated with a second reported battery consumption, if the second reported battery consumption is lower than the first reported battery consumption, or after a network-based protection measure (e.g. affording a similar level of protection). The order of selection (and consequently activation) of host-based and/or network-based protection measures can be achieved by prioritizing protection measures and/or by changing the client threat-level, each protection measure is associated with (and triggered by). Such a change can be implemented as a host-based bias or offset, which is determined from the battery consumption reported by the respective network client; i.e. it will apply only to the specific network client. The bias or offset can be applied to a generally pre-defined order of protection measures (e.g. pre-defined based on the invasiveness of the respective measures).

To further balance the enabling of battery demanding protection measures, the current power supply status (e.g. battery charging level, charging connection) of the mobile network client and/or the power consumption (average utilization of battery over a certain amount of time) may be transmitted to the network gateway as an internal influence. As such it can be taken into account by the network gateway when deciding to enable battery demanding protection measures for mobile devices and may hold back an action command to a mobile device commanding such a measure.

The security modules on the mobile device itself may be configured to decide to enable battery demanding protection measures on their own (thus overriding the action command sent out by the network gateway), if the device is plugged into an electrical outlet. In this case, battery consumption is not a factor and disabling of security measures not reasonable. These measures can be automatically disabled, if not decided otherwise through an action command from the network gateway, as soon as the mobile device is disconnected from the electrical power outlet and back on battery power.

Moreover, an associated data use may be taken into account during selection of host-based and/or network-based protection measures. Optimal mobile data use on mobile network clients is achieved by carefully controlling data heavy transfer operations. Based on the client threat-level, and thus the likeliness to be exposed to a security threat, data heavy demanding actions on the mobile network client, like updates of security signatures of an Anti-Virus engine, may be either disabled for a certain period of time (low threat level), postponed for a short time until the mobile network client is on a private WiFi or other free data connection (medium threat level) or enforced even though there might be costs for the user (high threat level). Other examples of mobile data demanding operations are the transfer of usage behaviour data from a network client as an influence to the network gateway. Such usage behaviour data may include device usage, apps usage, geographic positions, WiFi connectivity information or other statistical usage data available on the mobile device, all of which are not connected to an actual security event on the mobile device but rather information used as an internal influence by the network gateway when determining the optimum protection measures. In particular, these influence factors may be taken into account by the network gateway when deciding to enable mobile data demanding host-based protection measures for mobile devices and may hold back an action command to a mobile device commanding such a measure. The security modules on the mobile device itself may be configured to decide to perform mobile data demanding processes on their own (thus overriding the Command sent out by the Correlation & decision engine), for example if the device is connected to a private WiFi.

In order to achieve the advantages described above, the computer-implemented method according to the present invention may further comprise: modifying the selection and/or timing of the action command transmitted from the network gateway to a network client, instructing the network client to activate a host-based protection measure, to prefer network-based protection measures or host-based protection measures requiring no or less data transfer than other host-based protection measures and/or to postpone host-based protection measures requiring more data transfer to a higher client threat-level. More specifically, a first host-based protection measure that, when activated, will cause a larger amount of data transfer, is selected only after a second host-based protection measure that, when activated, will cause no data transfer or a lower amount of data transfer than the first host-based protection measure, or after a network-based protection measure (e.g. affording a similar level of protection). The order of selection (and consequently activation) of host-based and/or network-based protection measures can be achieved by prioritizing protection measures and/or by changing the client threat-level, each protection measure is associated with (and triggered by). Such a change may be implemented as a host-based bias or offset; i.e. it may apply only to a specific network client. The bias or offset can be applied to a generally pre-defined order of protection measures (e.g. pre-defined based on the invasiveness of the respective measures).

Advantageously the method according to the present invention may further comprise: receiving, at the network gateway, a general security warning from a trusted external source, after receiving the general security warning, increasing, at the network gateway, all client threat-levels based on the content of the general security warning. Accordingly, a network gateway according to the invention may comprise means to perform the steps listed above.

In this way external influences, usually provided by independent security systems and/or redacted by human supervisors can be accounted for when selecting and applying protection measures at the network gateway and/or the network client. Examples for general security warnings are: ongoing phishing waves that are currently in place, new security leaks being actively enforced on devices or any other information that may influence the final security assessment and decision making.

In practice, there will be provisions for decreasing the client threat-level. For instance, any client threat-level that did not change within a predetermined period (e.g. 12 hours) can be decreased by a constant value (i.e. the decay parameter) until it reaches a defined initial value of the client threat-level.

Preferably the method according to the present invention may further comprise: after a predetermined amount of time or at a regular interval, decreasing, at the network gateway, all client threat-levels by a predetermined decay parameter. Accordingly, a network gateway according to the invention may comprise means to perform the step of decreasing client threat-levels as defined above.

In order to achieve the objective mentioned in the outset, the present invention generally also provides a distributed firewall system comprising a network gateway for monitoring a network traffic between a network client and the network gateway, and at least one network client connected to said network gateway and comprising means for applying host-based protection measures, wherein the network gateway has control of the means for applying host-based protection measures of the at least one network client.

In particular a distributed firewall system according to the invention may comprise a network gateway and a network client of one of the types described above.

According to a preferred embodiment of the invention, a distributed firewall system may comprise a network gateway for monitoring a network traffic between a network client and the network gateway, for testing the monitored traffic for one or more network traffic patterns indicating undesired behaviour of the network client, for increasing a client threat-level associated with the network client based on the matched one or more network traffic patterns if it results from the testing that one or more network traffic patterns are matched, and for sending an action command to a network client associated with said client threat-level, as soon as a client threat-level exceeds a predetermined acceptable range, instructing the network client to activate a host-based protection measure, and a network client for receiving an action command from the network gateway, instructing the network client to activate a host-based protection measure, and for activating the host-based protection measure instructed by the network gateway after receiving the action command.

More preferably, the network gateway of the distributed firewall system as defined above may be configured to perform the steps of activating a network-based protection measure as soon as a client threat-level exceeds a predetermined acceptable range, wherein the network-based protection measure is adapted to protect the network client from malicious network traffic or to notify a user of the network client of malicious network traffic.

In particular, the network client of the distributed firewall system defined above may be configured to perform the steps of monitoring device events occurring on the network client, testing the monitored device events for one or more device event patterns indicating undesired behaviour, and sending a device event report from the network client to the network gateway, reporting the matched device event patterns, if it results from the testing that one or more device event patterns are matched, and the network gateway of the distributed firewall system may be configured to perform the steps of receiving a device event report from the network client, reporting the matched device event patterns, and increasing a client threat-level associated with the network client based on the reported device event patterns after receiving the device event report.

Within the same object and purpose as the method, devices and systems described above, the present invention further provides a first computer program product comprising instructions which, when the program is executed by a network gateway, cause the network gateway to carry out the steps described as being carried out by a network gateway of one of the types described above. Specifically the first computer program product according to the invention comprises instructions which, when the program is executed by a network gateway, cause the network gateway to carry out the steps of: monitoring a network traffic between a network client and the network gateway, testing the monitored traffic for one or more network traffic patterns indicating undesired behaviour of the network client, increasing a client threat-level associated with the network client based on the matched one or more network traffic patterns, if it results from the testing that one or more network traffic patterns are matched, and sending an action command to a network client associated with said client threat-level, as soon as the client threat-level exceeds a predetermined acceptable range, the action command instructing the network client to activate a host-based protection measure; they may optionally further include: activating a network-based protection measure as soon as a client threat-level exceeds a predetermined acceptable range, wherein the network-based protection measure is adapted to protect the network client from malicious network traffic or to notify a user of the network client of malicious network traffic; and/or receiving a device event report from a network client, the device event report reporting one or more matched device event patterns, and increasing a client threat-level associated with the network client based on the reported device event patterns after receiving the device event report.

Also within the same object and purpose the present invention further provides a second computer program product comprising instructions which, when the program is executed by a network client, cause the network client to carry out the steps described as being carried out by a network client of one of the types described above. Specifically the second computer program product according to the invention comprises instructions which, when the program is executed by a network client, cause the network client to carry out the steps of: receiving an action command from a network gateway, instructing the network client to activate a host-based protection measure, and activating the host-based protection measure instructed by the network gateway after receiving the action command; they may optionally further include: monitoring device events occurring on the network client, testing the monitored device events for one or more device event patterns indicating undesired behaviour, and sending a device event report from the network client to the network gateway, reporting the matched device event patterns, if it results from the testing that one or more device event patterns are matched.

Finally, the present invention also concerns a computer-readable data carrier having stored thereon the first computer program product and/or the second computer program product as defined above.

BRIEF DESCRIPTION OF THE FIGURES

Referring now to the drawings, wherein the figures are for purposes of illustrating the present invention and not for purposes of limiting the same.

DETAILED DESCRIPTION

Figure 1:
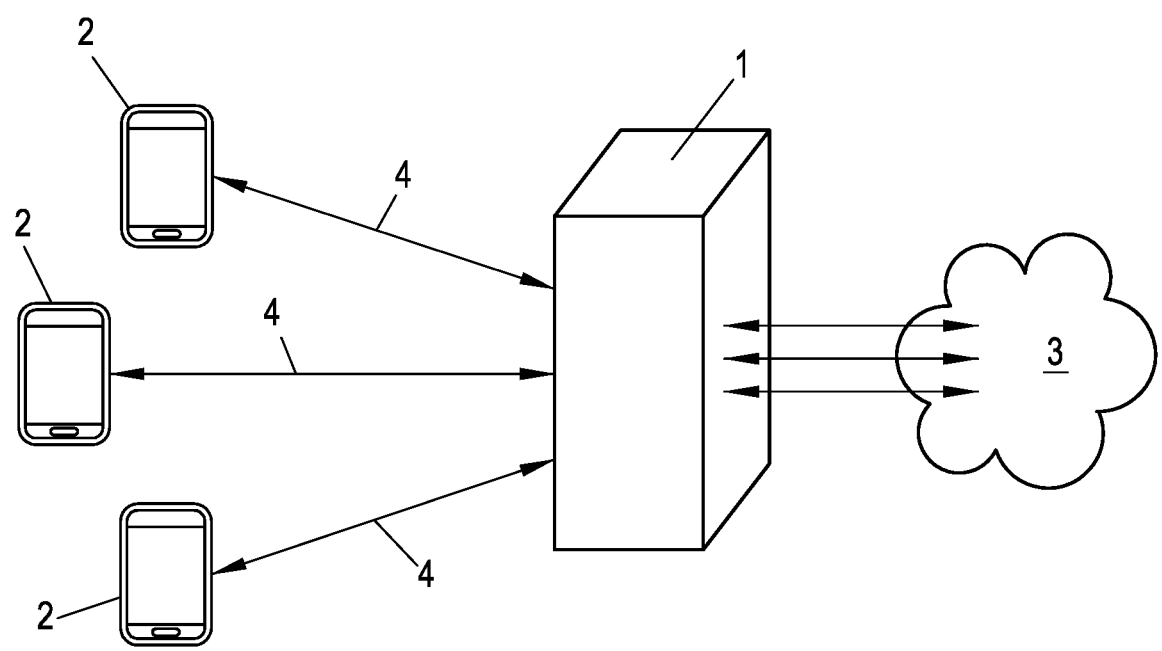
FIG. 1 schematically shows an exemplary structure of a distributed firewall system according to the present invention.

FIG. 1 shows an exemplary structure of a distributed firewall system comprising a network gateway 1 and three network clients 2. The network clients 2 are mobile device, in particular smartphones. They are connected to an external network 3, e.g. the Internet, via the network gateway 1. The network gateway 1 processes and proxies the network access requests and responses 4 from the network clients 2 to the external network 3. The network gateway 1 is capable of monitoring the network traffic handled between the network clients 2 and the external network 3.

The network gateway 1 comprises means for monitoring a network traffic between a network client 2 and the network gateway 1. The network gateway 1 comprises means for testing the monitored traffic for one or more network traffic patterns indicating undesired behaviour of the network client 2. The network gateway 1 comprises means for increasing a client threat-level associated with the network client 2 based on one or more matched network traffic patterns, if it results from the testing that one or more of the network traffic patterns are matched. Finally, the network gateway 1 comprises means for sending an action command to a network client 2 associated with said client threat-level, as soon as the client threat-level exceeds a predetermined acceptable range, the action command instructing the network client 2 to activate a host-based protection measure. The network client 2 comprises means for receiving the action command from the network gateway 1, instructing the network client to activate a host-based protection measure. The network client 2 also comprises means for activating the host-based protection measure instructed by the network gateway 1 after receiving the action command.

Figure 2:
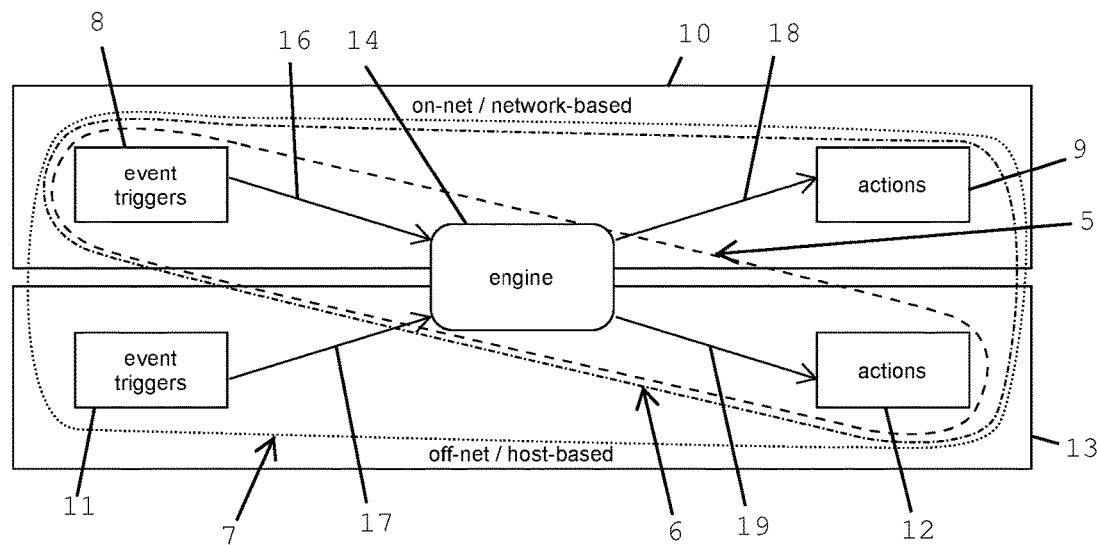
FIG. 2 schematically shows an overview of three possible stages of extension of a system according to FIG. 1 for using the present invention.

FIG. 2 indicates three different stages 5, 6, 7 of extension of a distributed firewall system according to FIG. 1, the stages 5, 6, 7 are indicated by differently dashed lines. Each of the stages 5, 6, 7 comprises different logical components 8, 9, 11, 12 of a distributed firewall system. In each stage one or more logical components 8, 9 of a network-based ("on-net") group 10 and one or more logical components 11, 12 of a host-based ("off-net") group 13 are involved. The logical components 8, 9 in the network-based group 10 are located at the network gateway 1. The logical components 11, 12 in the host-based group 13 are located at each of the network clients 2. All logical components 8, 9, 11, 12 are connected to a security engine 14 which is located partially at the network gateway 1 and partially at the network clients 2 as indicated by its overlapping position.

The logical components indicated in FIG. 2 are either trigger events 8, 11 or triggered actions 9, 12. The events 8, 11 provide the security engine 14 with information relevant for a security assessment, i.e. they represent the inputs from the network gateway 1 and the network clients 2. The actions 9, 12 represent the protection measures triggered by the security engine 14 at the network gateway 1 (in case of network-based protection measures) and/or at one or more of the network clients 2 (in case of host-based protection measures).

The network-based event 8 is representative of one or more network-based triggers which are provided for monitoring the traffic between a network client 2 and the network gateway 1. The monitoring is performed by a part of the security engine 14 located at the network gateway 1 as indicated by the arrow 16. The host-based event 11 is representative of one or more host-based triggers which are provided for monitoring device events occurring at a network client 2. The monitoring is performed by a part of the security engine 14 located at the network client 2 as indicated by the arrow 17.

The network-based action 9 is representative of one or more network-based protection measures which are activated and applied by the network gateway 1 as indicated by the arrow 18. The host-based action 12 is representative of one or more host-based protection measures which are activated and applied by a network client 2 as indicated by the arrow 19.

In the first stage 5 of extension of the distributed firewall system, the security engine 14 receives information only from the network-based event 8. In this stage the security engine 14 does not receive information from the host-based event 11. Concerning the protections measures, at the first stage 5 of extension the security engine 14 is configured to activate only a host-based action 12, i.e. only host-based protection measures are activated in response to security incidents detected from the monitored traffic.

In the second stage 6 of extension, the security engine 14 still receives information only from the network-based event 8 and not from the host-based event 11. However, at the second stage 6 of extension the security engine 14 is configured to activate either a host-based action 12 or a network-based action 9 or both actions 9, 12, i.e. host-based and/or network-based protection measures may be activated in response to security incidents detected from the monitored traffic.

At the second stage 6 of extension, the network gateway 1 comprises means for activating a network-based protection measure as soon as a client threat-level exceeds a predetermined acceptable range, wherein the network-based protection measure is adapted to protect the network client 2 from malicious network traffic or to notify a user of the network client 2 of malicious network traffic.

In the third stage 7 of extension of the distributed firewall system, the security engine 14 in addition to the second stage 6 also receives information from a host-based event 11. I.e. the security engine 14 may activate host-based and/or network-based protection measures in response to security incidents detected from the monitored traffic as well as from the monitored device events from the network clients 2.

At the third stage 7 of extension the network client 2 comprises means for monitoring device events occurring on the network client 2. It further comprises means for testing the monitored device events for one or more device event patterns indicating undesired behaviour. Finally, the network client 2 comprises means for sending a device event report from the network client 2 to the network gateway 1, reporting the matched device event patterns, if it results from the testing that one or more device event patterns are matched. In addition, the network gateway 1 comprises means for receiving a device event report from a network client 2, the device event report reporting one or more matched device event patterns. The network gateway 1 further comprises means for increasing a client threat-level associated with the network client 2 based on the reported device event patterns after receiving the device event report. The reaction of the network gateway 1 once the client threat-level leaves an acceptable range has been described above and applies similarly to the third stage 7 of extension.

While the most comprehensive protection can be achieved with the third stage 7 of extension of the distributed firewall system, all three stages 5, 6, 7 of extension are workable embodiments of the present invention, which provide different graduations of security and protection at different respective system complexity and effort.

Figure 3:
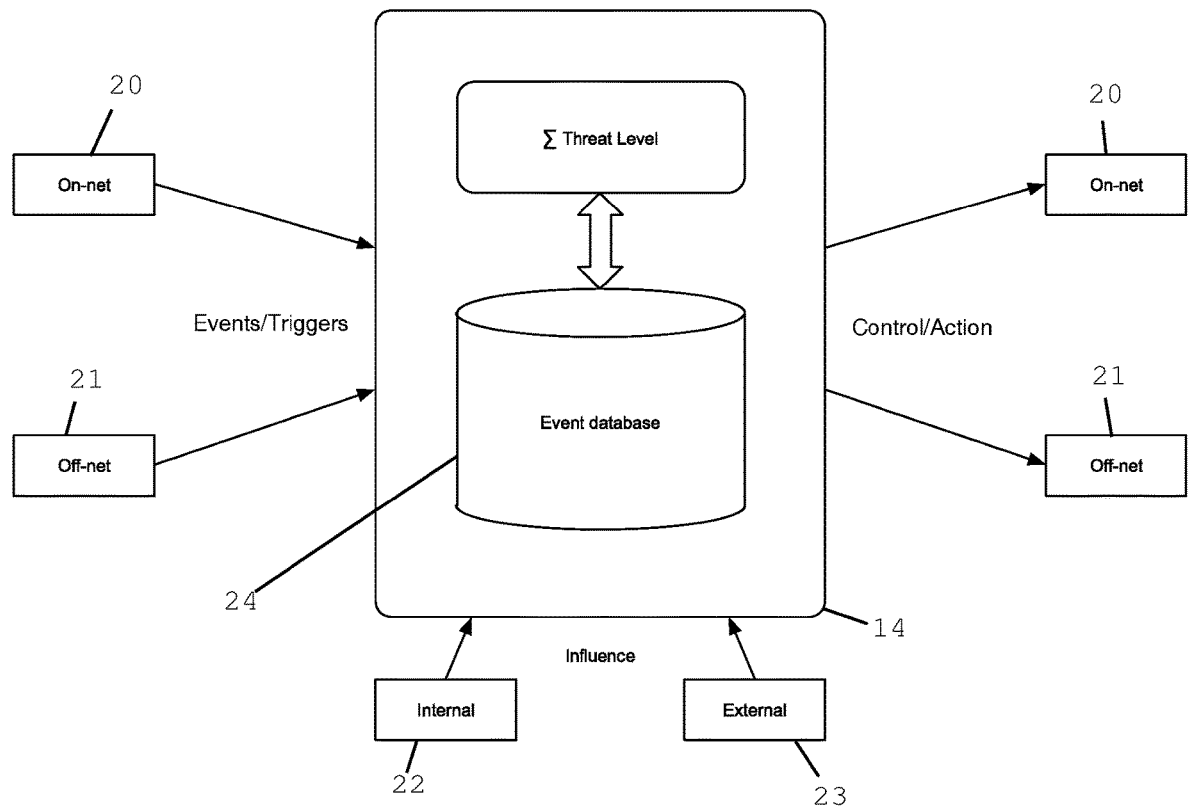
FIG. 3 schematically shows an architecture of an embodiment according to the present invention.

An exemplary embodiment of the third stage 7 of extension of a distributed firewall system is shown in FIG. 3. The security engine 14 takes as input the events from on-net devices 20, including the network gateway 1, and off-net devices 21, including the network clients 2, plus internal influences 22 and external influences 23, and calculates a threat-level per customer (e.g. per corresponding network client 2). Out of this assessment, controls in the form of action commands are sent to the on-net devices 20 and to the off-net devices 21 to trigger certain actions, in particular to activate certain protection measures.

All events that are happening on on-net devices 20 (such as a network firewall or a network web filter) and on off-net devices 21 (such events triggered by on-device security modules or anti-virus modules) are reported to the security engine 14 as they happen in real time. On-net events originate from network integrated (network-based) security devices (e.g. network firewall, network web filter) and can be any of traffic to web sites of a certain suspicious category (e.g. pornography, gambling, etc), traffic to web sites located in a suspicious country (e.g. a customer in Germany accessing a web sites in Vietnam), detection of suspicious content in network transaction (e.g. keywords that appear in messages) or any other indication of traffic that is suspicious as such. Such on-net events are triggered by matching corresponding network traffic patterns with the traffic monitored between the on-net devices including the network gateway 1 and the off-net devices including the network clients 2. Off-net events may originate directly from dedicated security modules installed on customer devices acting as network clients 2 (e.g. device security modules, anti-virus software) and can be any of entering an unsafe public WiFi, engaging a file transfer via Bluetooth connection with a $3^{rd}$ party, tampering of device security systems (e.g. disabling an on-device firewall module) or any other indication of suspicious actions as such. Such off-net events are triggered by matching corresponding device event patterns with the device events monitored on the off-net devices, including the network clients.

The influences 22, 23 indicated in FIG. 3 provide a source of additional information that allow the security engine 14 a better view on the collected on-net and/or off-net events in order to improve the correlation and decision making performed by the security engine. Internal influences 22 are calculated and collected from the data gathered by the events and triggers described above and may be any of the amount (count) of events from a single source, the time interval between events, the chronology of events, different events with the same underlying security cause or any other combination of individual events, that may influence the final security assessment and decision making. External influences 23 are provided from outside of the distributed firewall system, usually by human beings feeding the security engine 14 with useful information for the decision making. This may be information regarding ongoing phishing waves that are currently in place, new security leaks being actively enforced on devices or any other information that may influence the final security assessment and decision making.

All inputs, including on-net events, off-net events and internal and external influences are recorded in an event database 24. The security engine 14 evaluates the contents of the event database 24 and calculates a client threat-level per network client and customer in real-time based on the actual and stored events and influences. The client threat-level can be a weighted sum of all correlated events that allows to assess the security situation of each individual customer/network client. Control actions are triggered if a client treat-level reaches a threshold and exceeds a predetermined acceptable range (see FIG. 4).

Depending on the client threat-level of a network client, certain actions will be triggered through control channels to both on-net and off-net devices 20, 21. These actions are triggered if the client threat-level raises above a certain threshold (high watermarks) or below a certain threshold (low watermarks). On high watermark, actions to ensure security for the customer (and its network client) are triggered whereas on low watermark, these additional security measures are reduced again.

Actions triggered from the client threat-level for on-net security devices 20 may be, depending on the severity of the actual threat-level, injecting warnings into the data stream of customers by means of HTML messages to raise awareness to threats, enable the blocking of traffic from suspicious categories, resetting of customer overrides that have been made to circumvent on-net security measures (e.g. because of false positive alarms) as a precautionary action or any other action that enables security measures on-net (in the network of) an operator. Depending on the client threat-level, the least invasive security action is triggered to ensure the overall security status of a customer and avoid as far as possible negative side effects that would be noticeable if all actions are applied all the time (e.g. limitation of customer traffic, sites not reachable, data streams capped).

Actions triggered from the client threat-level for off-net security devices 21 may be, depending on the severity of the actual threat-level, sending a message to the customer device (the network client) to raise awareness of security threats by means of a message gateway (e.g. SMS, MMS, E-Mail, Push-notification), execute fast/shallow or slow/in-depth anti-virus scans on the network client, stop execution of unknown applications as a precautionary action, prohibit joining public WiFi networks or Bluetooth connections or any other action that triggers a security measure off-net (on the device of) customers. Depending on the client threat-level, the least invasive security action is triggered to ensure the overall security status of a customer device and avoid as far as possible negative side effects that would be noticeable if all actions are applied all the time (e.g. battery drain due to constant anti-virus scans, prohibition to start unknown applications, prohibition to join public WiFi networks).

Event correlation from both on-net and off-net devices 20, 21 allows to combine the findings and calculate a user specific client threat-level, a metric that can be used to assess the risk of a user to be exposed to security threats. Independent security modules as known from the prior art can only see and base their actions on the individual results of their analysis. A combination of various tools and methods, both on-net and off-net, allow a much broader view, assess the risk and trigger actions to ensure safety for the user.

Furthermore, many protection measures are very time consuming and/or have high performance impacts (e.g. anti-virus scanning or deep application analysis like sandboxing). Performing these measures constantly without the user noticing a degradation of performance is not feasible. Because of this performance impact, these measures are often only applied at specific timer intervals, thus degrading the achievable security.

According to the present invention client threat-levels may be constantly adjusted and calculated in real-time from: on-Net triggers/events; detection of access to suspicious network targets based on URL categorization; detection of signatures of malicious network communication based on pattern detection; other trigger that detect unusual or malicious behaviour in network communication; off-Net triggers/events; change of WiFi connection to an insecure/unencrypted connection, direct point-to-point connection to unknown device or a rogue access point; establishment of a Bluetooth connection for the purpose of exchanging files; use of suspicious device software or software that has performed malicious behavior; and/or other trigger that detect unusual or malicious behaviour of software on the device. Calculations are performed by multiplication of event triggers with a weight (severity of the trigger) and summing up the events that happen in a specific time-frame (observation period).

If the threat-level of a user raises over a configured threshold, specific protection measures on the device and/or on the network are triggered automatically to ensure safety: anti-virus scan of device to detect and eliminate malicious code; deep scanning of running applications for unusual or malicious behavior; active notification to user to inform him about a possible threat by means of SMS, e-mail, push-notification or any other means of direct communication to the user; and ultimately disconnect the device from the network (turn off network connection) to eliminate the risk of data privacy breaches or malicious code causing damages.

Figure 4:
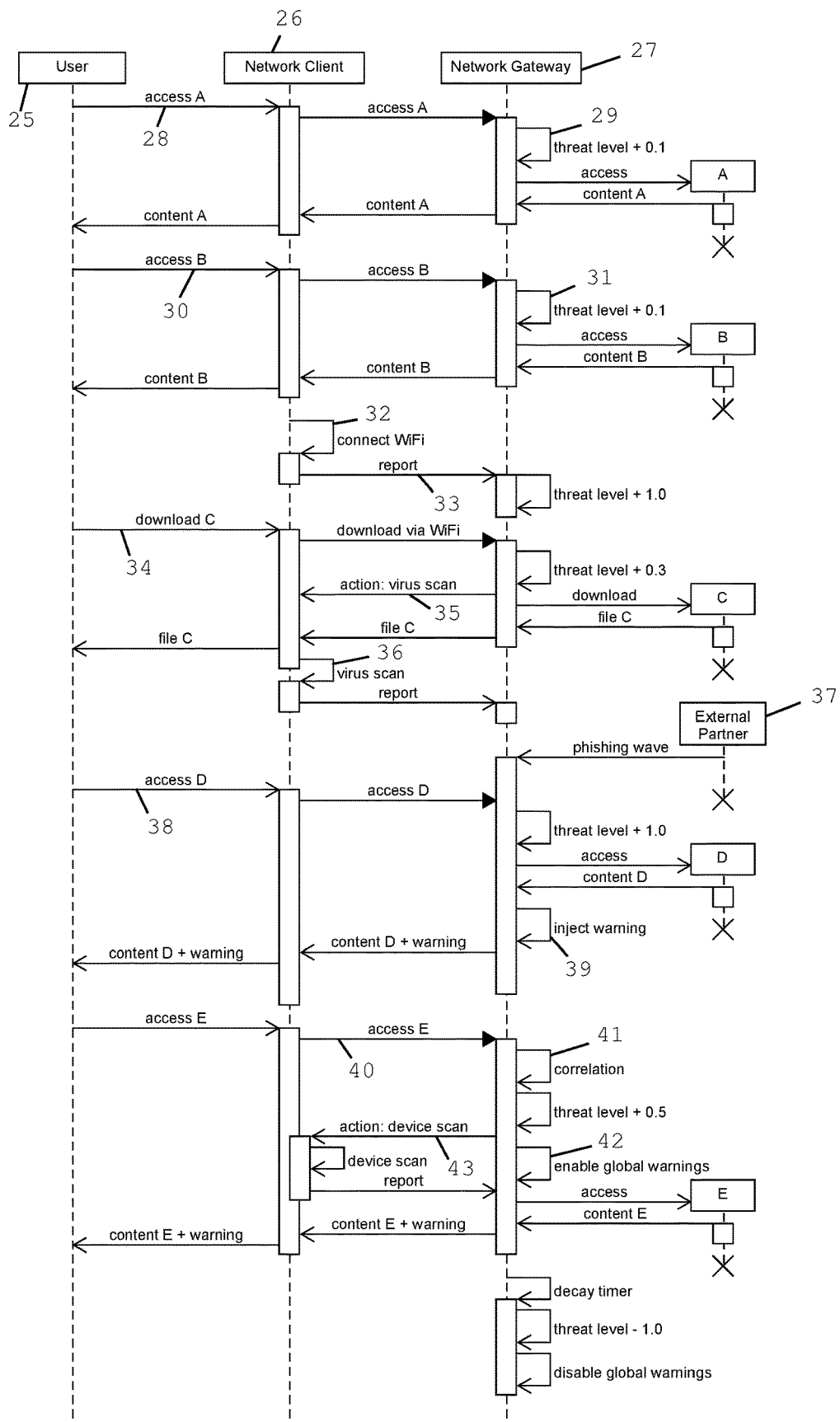
FIG. 4 shows a sequence diagram illustrating an exemplary use-case of the present invention.

FIG. 4 illustrates an exemplary use-case of the present invention in a sequence diagram. For simplicity, only one user 25 and one network client 26 are shown. Of course, additional network clients may interact with the same network gateway 27 concurrently. Time scale is pointing downwards in FIG. 4. Only suspicious events or events that have impact on the client threat-level are outlined in the diagram. In between these events, the customer/client may perform many different actions that do not alter the threat-level in any way (e.g. accessing various web sites or conducting harmless Internet traffic).

At step 28 the user 25 accesses a known website A in the category "Gambling" (i.e. a website that is known to the distributed firewall system e.g. registered in a grey-list by means of an external influence), which indicates a web sites dedicated to illegal online gambling (e.g. online casinos). An access to a web site in this Internet category indicates a slightly increase in risk of security threats and raises the client threat-level associated with the network client 26 by 0.1 in step 29. The client threat-level for the user 25 is now set at 0.1. Otherwise the requested content is processes as expected.

At step 30 the user 25 accesses a known website B in the category "Violence/Hate Speech", which indicates a web sites with violent content and/or hate speech. An access to a web site in this Internet category indicates a slightly increase in risk of security threats and raises the client threat-level again by 0.1 in step 31. The client threat-level for the user 25 is now set at 0.2. Alternatively, if website B would be unknown, i.e. located at a domain which is valid (in terms of registered), but with unknown content (e.g. neither black-listed nor grey-listed nor white-listed), an access to a web site in this Internet category also indicates a slightly increase in risk of security threats and raises the client threat-level by 0.1.

At step 32 the network client 26 changes to an insecure WiFi connection. This happens if a public WiFi hotspot, usually found in public places for free customer use, is connected. Usage of such a WiFi hotspot with unclear security situation (e.g. no or untrusted encryption of the WiFi, other clients on the WiFi trying to hack participants, illegal traffic monitoring on the WiFi hotspot) indicates an increase in risk of security threats. It is detected as a device event and reported to the network gateway 27, which raises the client threat-level by 1.0 in response to the device event report 33. The client threat-level for the user 25 is now set at 1.2.

At step 34 the user 25 downloads content over the insecure WiFi connection. This further increases the risk of security threats and raises the client threat-level by 0.3. The client threat-level for the user 25 is now set at 1.5. A client threat-level of 1.5 corresponds to the first watermark and enables a Warning level. Enabling the Warning level immediately triggers the first action 35. The network client 26 is notified by the network gateway 27 to trigger a virus scan of the device. The virus scan is performed at step 36 and the result reported back to the network gateway 27.

Subsequently no new events are triggered by the network client. An external partner 37 reports a Phishing wave being executed at the moment, targeted at a payment provider. This external influence is registered by the network gateway 27. In step 38 the user 25 accesses a known website D in the category "Phishing", which indicates a web site targeted at stealing user data for the purpose of identity theft or credit card fraud. This further increases the risk of security threats and, in combination with the external influence of the report from the external partner 37, raises the client threat-level by 1.0. The client threat-level for the user 25 is now set at 2.5. The client threat-level of 2.5 is still above a first watermark and stays at the Warning level.

Processing the new event and staying on the Warning level triggers the next action 39 for this level. The user 25 will be shown an On-Net warning screen that shall raise the attention for possible security threats for the customer/client (e.g. "Please be warned—there is currently a Phishing attack targeted at customers of payment provider XYZ.").

At step 40 the network client 26 shows traffic to an unusual foreign domain. This further increases the risk of security threats and, in combination with the amount of events, which triggers a correlation in step 41 as an internal influence, raises the client threat-level by 0.5. The client threat-level for the user 25 is now set at 3.0. The amount of traffic to the unusual foreign domain is above the average traffic amount to this country and thus adds to the client threat-level. The client threat-level has now reached a second high watermark of 3.0, which enables the Risk level. On-Net and Off-Net actions 42, 43 for the Risk level are immediately activated. On-Net actions 42 enable warnings for traffic to suspicious web categories for the user 25 (e.g. web sites in categories like "Gambling", "Violence" or "Hate Speech"). Warning pop-ups aim to increase security awareness for the customer. Off-Net actions 43 activate a deep device scan on the customer/client device with the aim to find suspicious applications that may be source of the suspicious traffic events.

Thereafter no more events, neither On-Net nor Off-Net, are reported for the next 24 hours for this user 25. The client threat-level is decreased by 1.0 points because of no new events and now falls back to the Warning level. Fall-back to the Warning level disables the On-Net warnings for traffic to suspicious web categories again, thus reducing the security measures that are imposed to the user 25.

Figure 5:
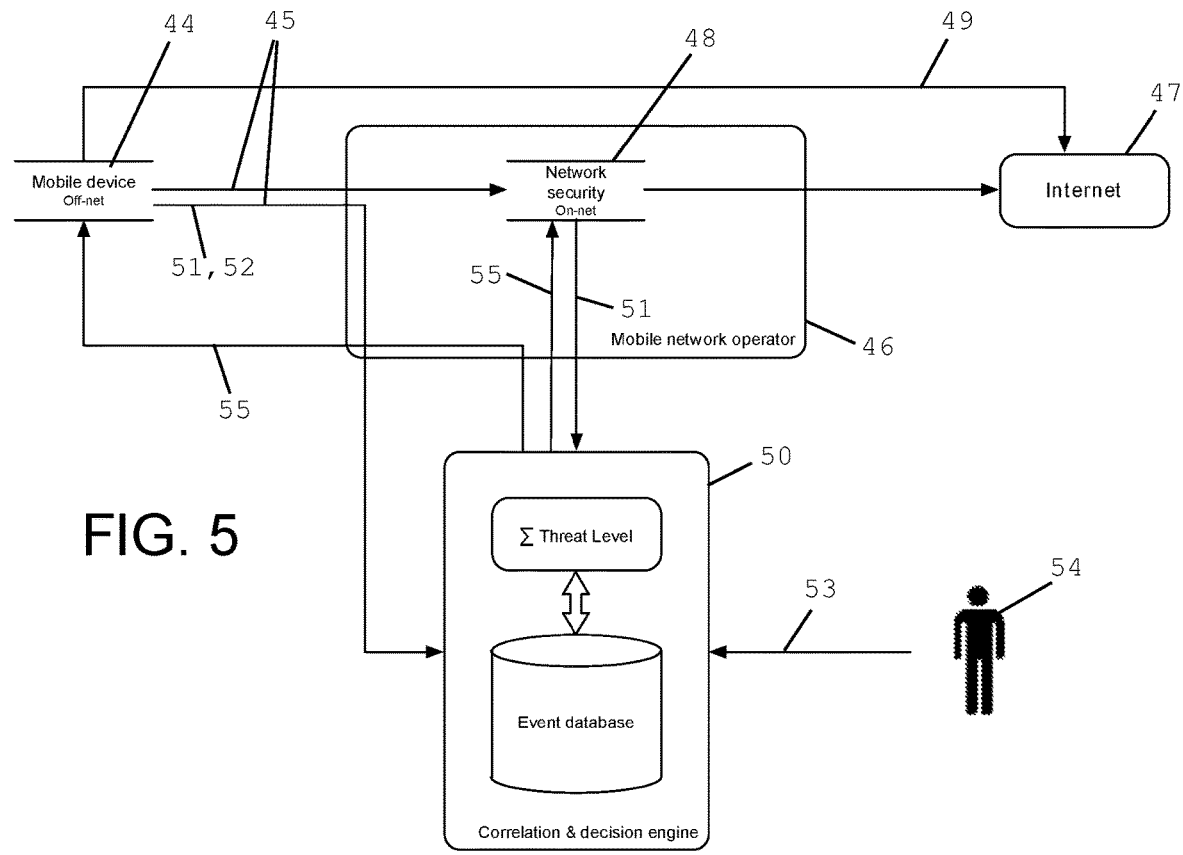
FIG. 5 illustrates possible connections of a network client of the distributed firewall system according to the present invention more in detail.

FIG. 5 shows a mobile device 44 (off-net) as a network client connected via a mobile data connection 45 provided by a mobile network operator 46 to the Internet 47. The mobile network operator 46 provides a network gateway with an on-net network security component 48 that is configured to monitor traffic from mobile customers such as the mobile device 44. The on-net network security component 48 is connected to a security engine 50 via an operator network. The mobile device 44 is connected via private or public WiFi 49 to the Internet 47.

The mobile device 44 comprises off-net components implemented as security modules that are connected to the security engine 50 via the mobile data connection 45. Event messages 51 to the security engine 50 are sent from the security modules installed on the mobile device 44 of a user and from the network security component 48 which monitors network traffic of mobile users.

Internal influence messages 52 to the security engine 50 are sent from security modules installed on the mobile device 44 of a user. These messages include behaviour data from the user, such as mobile device usage in general, app usage, network connectivity information, geographic position or other statistical information available on mobile device 44 that may be important to detect abnormal behaviour and can act as an internal influence 22 (see FIG. 3) for the calculation of the client threat level. Furthermore, external influence messages 53 may be sent to the security engine 50 by human operators 54 or automatically through APIs for any kind of general information that may influence the client threat level of all users, such as ongoing worldwide or targeted attacks to certain devices/users such as phishing attacks, malware outbreaks or general security events.

Action commands 55 to the security modules in the mobile device 44 and to the network security component 48 are sent from the security engine 50 when certain thresholds of the client threat level of a particular user or network client are reached. Furthermore, action commands 55 may be triggered directly by human operators 54 through the security engine 50 to individual users or globally to all users to force a specific action on on-net or off-net components. The need for such a human interaction may be the interaction with a user through a channel outside the scope of the threat level system (e.g. to help a user by phone on a helpdesk).

Figure 6:
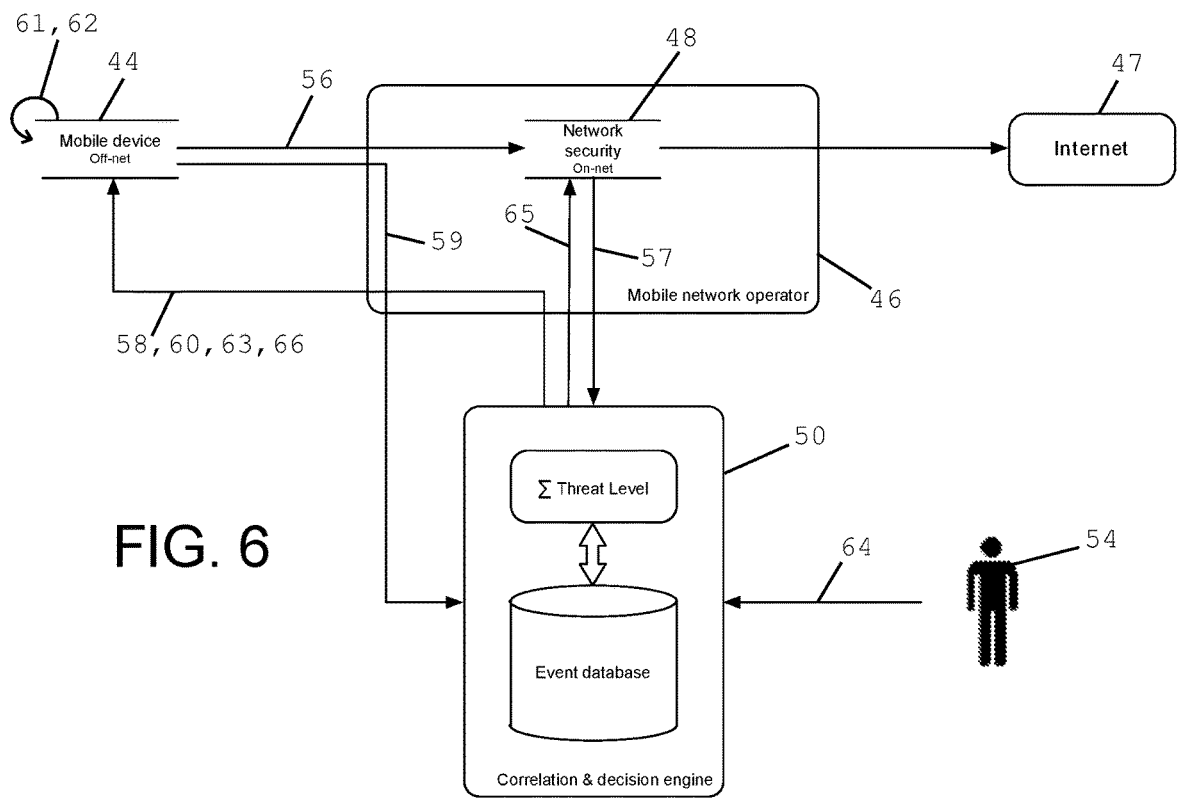
FIG. 6 illustrates the control flow for some exemplary action commands transmitted over the connections shown in FIG. 5.

FIG. 6 illustrates a few exemplary message and control flows indicated by arrows. Customer accesses 56 a known web site that distributes malware. The access is detected by the network security component 48 in the operator network. An event 57 is sent from this module to the security engine 50. The security engine 50 triggers an action 58 and sends a message to the mobile device 44 to enable an Anti-Virus security module. The Customer opens an e-mail attachment on his mobile device 44. The Anti-Virus security module scans the e-mail attachment and finds a suspicious code fragment. An event 59 is sent from this module to the security engine 50. The security engine 50 triggers an action 60 and sends a message to the customers mobile device to enable the Anti-Virus security module for an immediate full file system scan. Furthermore, scans are schedule repeatedly. (These actions are highly computing power and battery demanding.) The mobile device's security module decides 61, based on available battery power on the mobile device 44 (e.g. a phone), to postpone the scheduled Anti-Virus scan to a later time. Later, the mobile device 44 is connected to a power outlet and the security module on the mobile device now decides 62 to perform the scheduled Anti-Virus scan. After a period of not receiving any new events from the mobile device 44, the security engine triggers an action 63 and disables the Anti-Virus security module. (This reduces power consumption on the mobile device.) The user calls the telephone helpdesk and asks for help because the mobile device is not usable any more (e.g. screen is locked and secured with a passphrase through a malware infection). A human operator sends 64 a control message 65 through the security engine 50 to the on-net network security component 48 to stop all traffic from the affected mobile device 44 to avoid any data leakage and another control message 66 directly to the security modules in the mobile device 44 to initiate an Anti-Virus scan to clean up the security incident.

The invention claimed is:

1. A computer-implemented method comprising:
monitoring, at a network gateway, a network traffic between a network client and the network gateway,
testing, at the network gateway, if the monitored traffic matches one or more network traffic patterns indicating undesired behaviour of the network client,
if it results from the testing that the monitored traffic matches the one or more network traffic patterns indicating undesired behaviour, increasing, at the network gateway, a client threat-level associated with the network client based on the matched one or more network traffic patterns,
transmitting, when the client threat-level exceeds a predetermined acceptable range, an action command from the network gateway to the network client associated with said client threat-level, to instruct the network client to activate a host-based protection measure, and
after receiving the action command, activating, at the network client, the host-based protection measure instructed by the network gateway,
wherein the host-based protection measure on the network client triggered by the reception of the action command is adapted to obstruct further undesired behavior,
wherein the action command is one of different action commands triggering different host-based protection measures at the network client depending on the current client threat-level.

2. The computer-implemented method according to claim 1, further comprising:
activating, when the client threat-level exceeds a predetermined acceptable range, at the network gateway, a network-based protection measure,
wherein the network-based protection measure is adapted to protect the network client from potentially malicious network traffic or to notify a user of the network client of malicious network traffic,
wherein malicious network traffic is network traffic related with the undesired behaviour indicated by the matched network traffic patterns.

3. The computer-implemented method according to claim 1, further comprising:
concurrently with the monitoring of the network traffic between the network client and the network gateway at the network gateway, monitoring, at the network client, device events occurring on the network client, testing, at the network client, the monitored device events for one or more device event patterns indicating undesired behaviour, if it results from the testing that one or more device event patterns are matched, transmitting a device event report from the network client to the network gateway, reporting the matched device event patterns, and after receiving the device event report, increasing, at the network gateway, the client threat-level associated with the network client from which the device event report has been received based on the reported device event patterns.

4. The computer-implemented method according to claim 1, further comprising:

reporting a battery consumption associated with the host-based protection measure from the network client to the network gateway, and modifying the selection and/or timing of the action command transmitted from the network gateway to the network client, said action command instructing the network client to activate the host-based protection measure, to prefer network-based protection measures or host-based protection measures associated with a reported relatively low battery consumption and/or to postpone host-based protection measures associated with a reported relatively high battery consumption to a higher client threat-level.

5. The computer-implemented method according to claim 1, further comprising:

modifying the selection and/or timing of the action command transmitted from the network gateway to the network client, said action command instructing the network client to activate the host-based protection measure, to prefer network-based protection measures or host-based protection measures requiring no or less data transfer than other host-based protection measures and/or to postpone host-based protection measures requiring more data transfer to a higher client threat-level.

6. A network gateway comprising a processor and memory storing instructions, the instructions comprising steps of:

monitoring a network traffic between a network client and the network gateway, testing if the monitored traffic matches one or more network traffic patterns indicating undesired behaviour of the network client, if it results from the testing that the monitored traffic matches the one or more network traffic patterns indicating undesired behaviour, increasing a client threat-level associated with the network client based on the matched one or more network traffic patterns, and sending an action command to the network client associated with said client threat-level, when the client threat-level exceeds a predetermined acceptable range, the action command instructing the network client to activate a host-based protection measure, wherein the action command is one of different action commands triggering different host-based protection measures at the network client depending on the current client threat-level.

7. The network gateway according to claim 6, further comprising instructions for:

activating a network-based protection measure when the client threat-level exceeds a predetermined acceptable range, wherein the network-based protection measure is adapted to protect the network client from malicious network traffic or to notify a user of the network client of malicious network traffic.

8. The network gateway according to claim 6, further comprising instructions for:

receiving a device event report from the network client, the device event report reporting one or more matched device event patterns, and increasing the client threat-level associated with the network client based on the reported device event patterns after receiving the device event report.

9. The distributed firewall system comprising a network gateway according to claim and a network client comprising a processor and memory storing instructions, the instructions comprising steps of:

receiving an action command from a network gateway, said action command instructing the network client to activate a host-based protection measure, and activating the host-based protection measure instructed by the network gateway after receiving the action command.

10. The distributed firewall system according to claim 9, the instructions further comprising steps of:

monitoring device events occurring on the network client, testing the monitored device events for one or more device event patterns indicating undesired behaviour, and sending a device event report from the network client to the network gateway, reporting the matched device event patterns, if it results from the testing that one or more device event patterns are matched.

* * * * *